(12) United States Patent
Massonnet

(10) Patent No.: US 7,784,740 B2
(45) Date of Patent: Aug. 31, 2010

(54) STAR BLANKING METHOD, DEVICE AND ASSEMBLY THEREFOR

(75) Inventor: Didier Massonnet, Saint-Orens de Gameville (FR)

(73) Assignee: Centre National d'Etudes Spatiales, Paris (FR)

( * ) Notice: Subject to any disclaimer, the term of this patent is extended or adjusted under 35 U.S.C. 154(b) by 726 days.

(21) Appl. No.: 10/591,596

(22) PCT Filed: Mar. 2, 2005

(86) PCT No.: PCT/FR2005/000494

§ 371 (c)(1),
(2), (4) Date: Jun. 4, 2007

(87) PCT Pub. No.: WO2005/088379

PCT Pub. Date: Sep. 22, 2005

(65) Prior Publication Data

US 2007/0278351 A1    Dec. 6, 2007

(30) Foreign Application Priority Data

Mar. 5, 2004 (FR) .................................. 04 02339

(51) Int. Cl.
*B64G 1/10* (2006.01)
(52) U.S. Cl. .................................................. 244/171.1
(58) Field of Classification Search .............. 244/171.1, 244/171.2, 171.7, 158.1, 158.4, 171, 164; 359/234

See application file for complete search history.

(56) References Cited

U.S. PATENT DOCUMENTS

| | | | |
|---|---|---|---|
| 4,453,224 A * | 6/1984 | Crooks, Jr. ................. | 359/399 |
| 4,923,293 A | 5/1990 | Nelles et al. | |
| 5,249,080 A * | 9/1993 | Watson et al. ............... | 359/601 |
| 5,291,333 A | 3/1994 | Mills et al. | |
| 5,410,143 A * | 4/1995 | Jones ....................... | 250/206.1 |
| 6,219,185 B1 * | 4/2001 | Hyde ........................ | 359/565 |

(Continued)

OTHER PUBLICATIONS

Anonymous, "Extrasolar planet," Internet Article, Oct. 18, 2004, XP002302123, http://en.wikipedia.org/wiki/Extrasolar_planet, 6 pages.

(Continued)

*Primary Examiner*—Michael R Mansen
*Assistant Examiner*—Brian M. O'Hara
(74) *Attorney, Agent, or Firm*—Foley & Lardner LLP

(57) ABSTRACT

The invention relates to a self-contained device (4) for blanking out the light rays from at least one star (1), which device (4) comprises means (43) for controlling propulsion means (44) which are in turn capable of moving or halting the device (4) in space and/or on a pseudo-orbit in space around an observation telescope (2) comprising an observation opening (21), characterized in that it comprises a blanking-out screen (40), wherein the means (43) for controlling the propulsion means (44) are further capable of positioning the screen (40) on the sighting axis (3) between the telescope (2) and the star (1) during an observation period such that the light rays from the star (1) are at least partially blanked out during said observation period as far as said observation opening (21) is concerned. The invention further relates to an assembly comprising at least one such device and a method for using said device or said assembly.

3 Claims, 2 Drawing Sheets

U.S. PATENT DOCUMENTS

| | | | |
|---|---|---|---|
| 6,568,640 B1* | 5/2003 | Barnett | 244/158.3 |
| 6,585,193 B1* | 7/2003 | Kustas et al. | 244/169 |
| 2007/0164164 A1* | 7/2007 | Cepollina et al. | 244/158.1 |
| 2008/0111031 A1* | 5/2008 | Mobrem | 244/172.6 |

OTHER PUBLICATIONS

Hull et al., "Eclipse Telescope Design Factors," Proceedings of the SPIE—the International Society for Optical Engineering SPIE—Int. Soc. Opt. Eng. USA, vol. 4860, 2003, pp. 277-287, XP002302124.

Serabyn, Gene, "Comparison of High Dynamic Range Near-Neighbor Detection Approaches for TPF[1,2]," 2002 IEEE Aerospace Conference Proceedings (Cat. No. 02TH8593), Dec. 22, 2001, vol. 4, pp. 4.1685-4.1694, XP002302125.

Lillie et al., "Infrared Coronograph for the Terrestrial Planet Finder Mission I: Overview and Design Concept," Proceedings of the SPIE—The International Society for Optical Engineering SPIE—Int. Soc. Opt. Eng. USA, vol. 4860, 2003, pp. 84-95, XP002302126.

Casement et al., "Infrared coronagraph for the Terrestrial Planet Finder Mission II: Instrument design and performance," Proceedings of the SPIE—The International Society for Optical Engineering SPIE—Int. Soc. Opt. Eng. USA, vol. 4860, 2003, pp. 96-107, XP002302127.

Krist et al., "Jovian Planet Finder optical system," Proceedings of the SPIE—The International Society for Optical Engineering SPIE—Int. Soc. Opt. Eng. USA, vol. 4860, 2003, pp. 288-294.

* cited by examiner

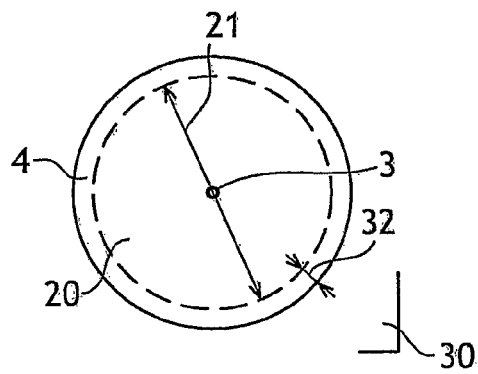
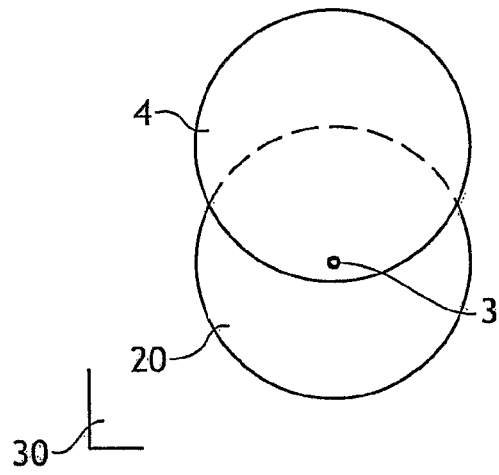
FIG.5A
FIG.5B
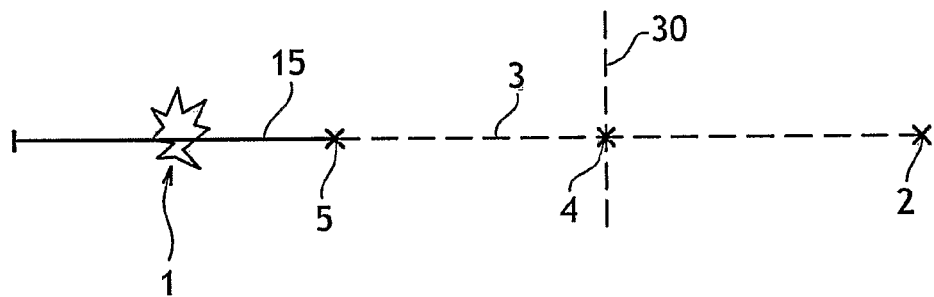
FIG.6
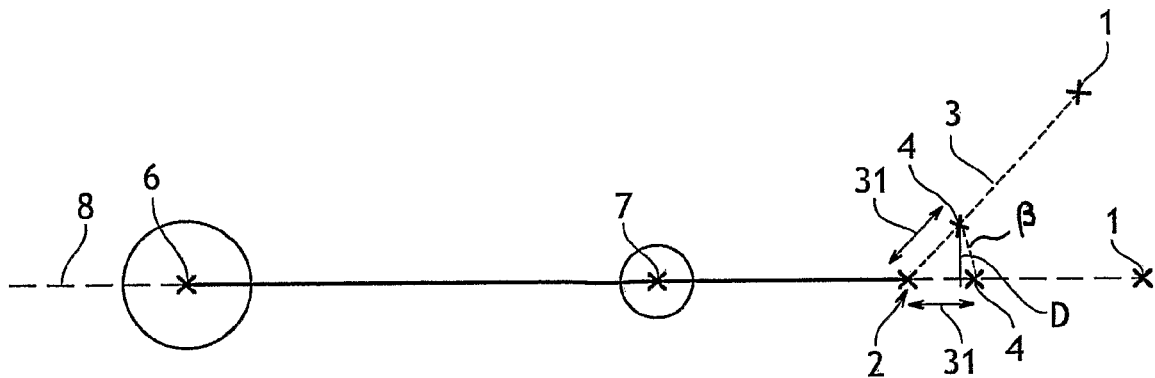
FIG.7

STAR BLANKING METHOD, DEVICE AND ASSEMBLY THEREFOR

CROSS REFERENCE TO RELATED APPLICATIONS

This application is a National Stage application of PCT/FR2005/000494, filed Mar. 2, 2005, which claims priority from French patent application FR 0402339, filed Mar. 5, 2004.

GENERAL TECHNICAL AREA

This present invention concerns a stellar blanking device, an assembly that includes a telescope and a blanking device, and a method that uses this assembly.

BACKGROUND

The search for planets of the terrestrial type outside of the solar system, and the determination of their characteristics, is a central element of the astronomical scene. It is in response to a profound demand from the public.

Many missions adopt this as their objective, proposing the use of advanced techniques.

They use flying arrays of telescopes, whose light is combined in a central "hub". Such an array can be used to cancel out the image of a star and to detect any planets that are close to the latter.

The desirable attenuation factor is of the order of a billion, and there is little doubt that these missions will not be launched before 2020.

A device that is simpler than a conventional space telescope is known from document FR 2 840 416. This document describes a device which, in particular, is lighter than a conventional telescope, and which includes a Fresnel lens associated with a remote detector.

This device is able to work only on light of the low coherence type. It is able to focus only very narrow-spectrum radiation whose focus is obtained by an appropriate distancing of the receiver, equipped with ad-hoc filtering where necessary.

The performance of this type of device is based on the fact that most of the light of a star is not focussed because it is not coherent, and because it is not on the right frequency. As an example, during an observation, it is possible to concentrate only on a transition of the ozone in order to detect an "interesting" planet.

Furthermore, the device provides very large apertures, of the order of 100 m in diameter, for example, since it is necessary only to deploy a membrane consisting of alternate transparent and opaque zones, whose flatness constraints are low.

Nevertheless, the device described in document FR 2 840 416 has drawbacks, and the prospects of deploying such a device remain remote.

In fact this is a new technology that is difficult to master. Construction of the Fresnel lens requires great precision, in particular regarding location of the opaque and transparent zones, and is relatively costly to create.

SUMMARY OF THE INVENTION

The invention proposes to get around at least one of the drawbacks of the devices of previous design.

The invention has as its objective to propose a device that allows the observation of planets close to a star, where the device is easy to make and low in cost.

To this end, the invention proposes an autonomous device for blanking out the light radiation emitted by at least one star, where the device includes means designed to control propulsion means which themselves are designed to move or stop the device in space and/or on a pseudo-orbit in space around an observation telescope that includes an observation aperture, characterised in that it includes a blanking screen, with the control means of the propulsion means also being designed to place the screen on the line of sight between the telescope and the star during a period of observation, so that the light radiation from the star is at least partially blanked from the observation aperture of the telescope during the said observation period.

The invention is advantageously completed by the following characteristics, taken individually or in any combination that is technically possible:

- one blanking dimension of the screen is of the same order of magnitude as the observation aperture of the telescope;
- the screen is flexible and/or articulated;
- the screen includes means designed to deploy or fold the screen;
- it includes means designed to move the screen in relation to the device, in order to modify the degree of blanking of the light from the star in relation to the observation aperture of the telescope;
- it also includes reflectors of a laser signal, or radio responders, for positioning of the device;
- the propulsion means are also designed to position the device in a pseudo-orbit around the telescope.

The invention also concerns an assembly that includes at least one such device and a method to use such a device or assembly.

PRESENTATION OF THE FIGURES

Other characteristics, objectives and advantages of the invention will emerge from the description that follows, which is purely illustrative and not limiting in any way, and which should be read with reference to the appended drawings in which:

FIGS. 5A and 5B show two possible positions of a screen of a blanking device in relation to a collecting area of a telescope in a plane that is perpendicular or more or less perpendicular to the line of sight;

FIG. 6 shows a planet in an alignment of the star, the blanking device, and the telescope; and FIG. 7 shows a blanking device outside the plane of the Earth-Sun ecliptic.

In all of these figures, similar elements have identical numerical references. The distances and the dimensions on the drawings are naturally schematic and not to scale.

DETAILED DESCRIPTION OF THE INVENTION

Figure 1:
FIG. 1 is a schematic representation of the relative positions of a star, a blanking device and an observation telescope.

As shown in FIG. 1, the invention uses the principle of blanking a star in the far field, by associating a particular device 4, called a "blanking device" in the remainder of this present description, with a high-performance space telescope 2. The function of the blanking device 4 is to block the light radiation emitted by a star 1 by being positioned on the line of sight 3 between the telescope 2 and the star 1.

Advantageously, the telescope 2 is optimised for an observation in the visible and infrared spectra, and is thus able to detect the presence of planets around the star 1, once the light radiation from the star has been blocked.

Very advantageously, a blanking device 4 according to the invention is associated with a space telescope 2 of the future-generation type. One non-limiting example of such a telescope 2 is provided, for example, by the "Next Generation Space Telescope (NGST)", generally also known to the professionals in this area as the "James Webb Space Telescope (JWST)".

The NGST telescope 2 is an assembly which has been designed by NASA (the National Aeronautics and Space Administration), and in whose operation the ESA (the European Space Agency) participates actively.

As shown in FIG. 7, by launching a telescope 2 with a diameter of 8 meters in an "L2 orbit" (in a stable orbit at 1.5 million kilometers from the Earth 7, on a line between the Sun 6 and the Earth 7, in a direction away from the Sun 6 and beyond the Earth 7, it becomes possible to make very precise observations because of eliminating the background light diffused by the Earth's atmosphere.

The L2 orbit corresponds to the second Lagrange point of the Sun 6 and Earth 7 pairing. A Lagrange point is a point in space at which the gravitational potential created by the combination of two celestial bodies reaches a local maximum or minimum. Several Lagrange points exist for any given combination of two celestial bodies. Some of these are stable, meaning that a body of negligible mass in relation to the two celestial bodies, such as a blanking device or an artificial satellite for example, placed at one of these stable points in suitable conditions, remains in the vicinity of this point indefinitely.

The telescope 2 is preferably protected from the Sun 6 and from Earth 7 by means of a large deployable screen fixed onto the telescope 2, which allows the telescope assembly 2 to be cooled to a temperature of 35 degrees above absolute zero and endows it with an extraordinary sensitivity in the infrared. The launch of the NGST is planned for 2011.

For greater simplicity in the remainder of this present description, reference is made to the NGST telescope 2, but it should be understood that any high-performance space telescope can also be used, particularly for infrared observation.

Figure 2:
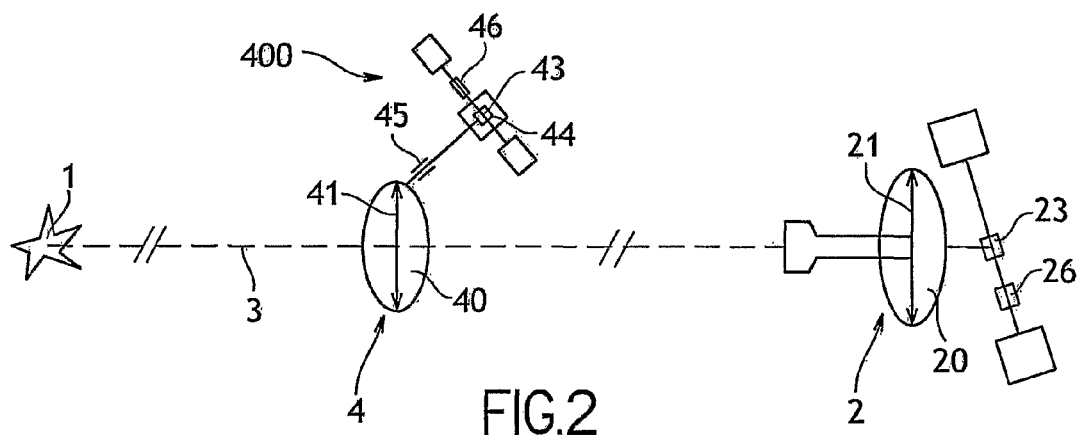
FIG. 2 is a more detailed schematic view of FIG. 1.

As shown in FIG. 2, the invention refers to the launch of a satellite 400 of very low mass, that includes a blanking device 4.

In order to establish the ideas by way of a non-limiting example, the typical size of a satellite 400 according to the invention is 10 meters in diameter.

The blanking device 4 mainly includes a screen 40 which can be a disk. The screen 40 is not necessary a disk however. A square or a triangle can also be used as screens 40.

The screen 40 has a diameter 41 which is at least equal to the observation aperture 21 of the NGST 2.

The total interruption of the visible and infrared light radiation coming from a star 1 can be achieved with a screen 40 composed of a metallic sheet with a thickness of 10 micrometers for example, deposited on a flexible support, in a plastic material for example. This thickness is not critical however. The finer the screen 40 and the opaque backing, the lighter the blanking device.

But even using a thickness of 100 micrometers, the mass constituted by an area of less than 100 square meters is of the order of 2 or 3 kilograms.

Preferably, the screen 40 is flexible or articulated so that it can be folded during the launch phase from Earth and deployed when in space.

The mechanism for deployment of the blanking device 4 is not critique either, since there is no flatness condition to be observed for the screen 40.

Figure 3:
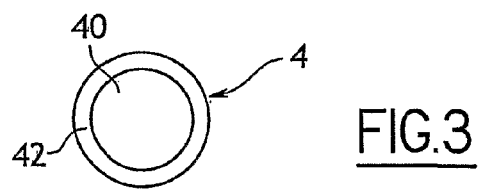
FIG. 3 is a schematic representation of one example of a system for the deployment of a screen of one possible blanking device according to the invention.

As shown in FIG. 3, it is therefore possible to envisage an inflatable structure 42 placed at the periphery of the screen 40 to allow deployment of the blanking device 4. Other structures can also be envisaged, such as articulated arms for example, accompanied by a deployment motor.

Figure 4:
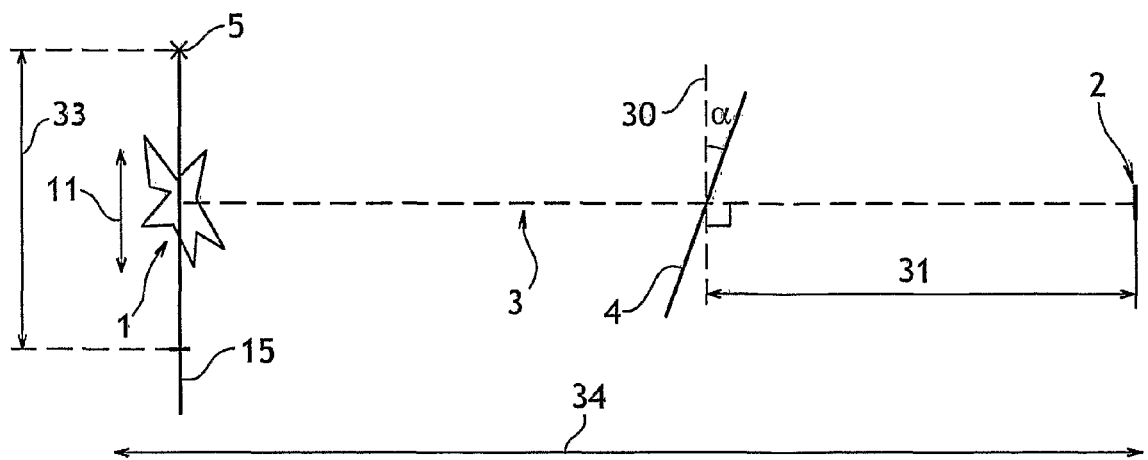
FIG. 4 is a schematic representation of the possible positions of a blanking device on a line of sight.

The aiming accuracy of the blanking device 4 presents no difficulty. In fact FIG. 4 shows that the blanking device 4 performs its function correctly whether it is perpendicular to the line of sight 3 or its position in relation to the line of sight 3 is within an angle α that swings on either side of a plane 30 perpendicular to the line of sight 3, as long as the angle is less than about 10 degrees.

The positioning of the blanking device 4 along the line of sight 3 between the NGST 2 and the Star 1 requires no precision.

Thus, the distance 31 between NGST 2 and the blanking device 4 on the line of sight 3 does not need to be precise. In fact at the distances concerned, even a thousand kilometers one way or the other changes nothing.

On the other hand, FIGS. 5A and 5B show that the geometric positioning of the blanking device 4 in the plane 30 perpendicular, or more or less perpendicular, to the line of sight 3 is important.

In fact in order to be able to detect a planet, the blanking device 4 must preferably completely blank out all light coming from the star 1 to any part of the collecting area 20 of the NGST 2. Thus, the positioning of the blanking device 4 is correct in FIG. 5A, since it blanks out all the collecting area 20 of the NGST. The blanking device 4 and the collecting area 20 are centred on the axis 3. However the positioning of the blanking device 4 is not satisfactory in FIG. 5B, since it is not blanking out all the collecting area 20 of the NGST. The blanking device 4 is off-centre in relation to the line of sight 3.

It can be seen from FIG. 5A that the positioning margin for the blanking device 4 in the plane 30 perpendicular, or more or less perpendicular, to the line of sight 3 is of the order of the amount 32 by which the diameter of the blanking device 4 exceeds that of the aperture 21 of the NGST.

In these conditions, a precision of the order of one meter is desirable. In fact the blanking device 4 will never be large enough to require ten meters. On the other hand, requiring ten centimeters makes no sense, considering the apertures concerned.

However the only the partial blanking of a star by the blanking device can also serve some purpose, and in particular allows Doppler measurements to be made on the rotation of a star.

The axis of rotation of the star can in fact be obtained by reducing the blanking from different directions, in the plane 30 perpendicular to the line of sight. When the direction of this reduction is perpendicular to the axis of rotation of the star, the Doppler signature of the partially blanked star is clearer. In order to clarify these ideas, and with reference to FIG. 4, the following orders of magnitude are used.

A typical star 1 has a diameter 11 of 2 million kilometers, and a typical distance 34 to the NGST 2 of 20 light years $1.89*10^{14}$ km).

A planet 5 of the terrestrial type orbits around this star 1 at a typical distance 33 of 200 million km. This orbit is represented perpendicularly to axis 3 in FIG. 4, but it should be understood that the orbit can assume any direction in relation to the star 1.

Therefore the angle at which the star 1 and the orbit of the planet are viewed by the NGST 2 is $10^{-8}$ radians and $10^{-6}$ radians respectively.

In order to blank out the star 1 without blanking out the planetary orbit, and also to adapt to slightly different values of these orders of magnitude, it will be assumed that a blanking angle of $10^{-7}$ radians will be required.

If, as shown in FIG. 6, the plane 15 of the planetary orbit contains the line of sight 3, then the planet 5 itself can also be blanked out by the blanking device 4 when it is passing in front of or behind the star 1. The planet 5 is therefore hidden in this case, when the planet 5, the star 5, the blanking device 4 and the NGST 2 are aligned.

In the case of the Earth, blanking out 10% of the light from the orbit corresponds to a maximum blanking time of the order of 12 days (the time that the Earth takes to cover the million hidden kilometers at its speed of 30 km/s).

An observation time per star of the order of one month is therefore satisfactory. This provides a good chance of finding a planet that is in the alignment of the star 1, the blanking device 4 and the NGST 2. It should be noted that this period is not the time during which NGST 2 is set up for a measurement, but the time when it can be set up for an observation.

For a blanking device 4 with a typical size of 10 meters, the angle of $10^{-7}$ radians represents a distance 31 to the NGST 2 of 100,000 km.

The implementation of the project therefore assumes the ability to place a blanking device 100,000 km from the NGST.

Preferably, the blanking device 4 is located at an Earth-Sun Lagrange point, namely at 1.5 million kilometers from the Earth. The NGST 2 is located on the L2 orbit, and the blanking device 4 is therefore located close to the NGST 2, in relation to the other distances concerned.

The blanking device 4 is positioned close to the Lagrange point, in any direction, and with a precision of the order of one meter, perpendicularly in the given line of sight 3 from the NGST 2 to the Star 1.

In terms of orders of magnitude, and as shown in FIG. 7, so that the blanking device 4 can jump to a distance 31 of 100,000 km from the plane 8 of the Sun 6-Earth 7 ecliptic, with an angle β of approximately 10 degrees, about 1.25 m/s must be supplied.

The orbitography in the vicinity of the Lagrange points is complex. The models that follow do not claim to be exact, but they give correct orders of magnitude.

Assume the following orders of magnitude therefore.

The Earth 7 orbits at 150 million km (R) from the Sun 6 in an orbit that is more or less circular, covered at 30 km/s (V). The acceleration G experienced by the Earth 7 due to the Sun 6 is then $V^2/R$. By being distanced by a value D from the plane of the ecliptic 8, the return acceleration of the Sun 6 becomes GD/R (since D<<R), which is $(V/R)^2 D$, or $10^{-6}$ m/s² if D=25,000 km (remember that aiming at 10 degrees from the plane 8 of the ecliptic with a distance of 100,000 km gives D=17,300 km).

The plane 8 of the ecliptic therefore acts as a spring with a stiffness of k=4 $10^{-14}$ $S^{-2}$, which gives a go and return period through the plane 8 of the ecliptic of $10^{+7}/\pi$ seconds (which is about 40 days) and a maximum speed crossing this plane 8 of 1.25 m/s.

In order to achieve such a distancing, a little over 1 m/s is therefore required, and in order to maintain it, a typical acceleration of $10^{-6}$ m·s$^{-2}$ is needed.

Similarly, from a circular orbit such as that of the Earth 7, it is possible to create an orbit of the same period with an increase of the eccentricity E, by the application of two pulses—the first on the circular orbit in order to increase the apohelion, and the second at the apohelion, to keep the orbit at the same period as that of the Earth 7.

The radius to the apohelion then increases by RE. The total pulse necessary is EV/2.

If it is desired to move away by 25,000 km, application of the formulae then gives a necessary pulse of 2.5 m/s.

However to create an eccentricity that would lead to a distance 31 of 100,000 km in relation to the L2 orbit in the plane of the ecliptic 8, then about 10 m/s would be required.

Around the L2 point, the relative orbits of the blanking device 4 in relation to the NGST 2 are covered in one year at a typical speed of 6 km/h.

The blanking device 4 therefore follows a pseudo-orbit around the Lagrange point, corrected in such as way that, for an observation, it is brought onto the line of sight 3 between the NGST 2 and a given star 1. It is therefore possible to determine the pseudo-orbit of the blanking device 4 around NGST 2 so that it passes in front of a certain number of interesting stars during its trajectory.

The control means 43 of the propulsion means 44 are designed to position the screen 40 on the line of sight 3 between the telescope 2 and the star 1 during a period of observation, so that the light radiation from the star 1 is at least partially blanked from the observation aperture 21 of the telescope 2 during the said observation period.

By means of the means 43 designed to control the propulsion means 44, the blanking device 4 can come to a stop during the observation, and then resume the speed of 6 km/h (i.e. execute a "stop and go" manoeuvre).

The propulsion means 44 allow the blanking device 4 to sustain its propulsion in order to immobilise the blanking device 4 in relation to the telescope for the duration of the observation. The corresponding acceleration would be of the order of $V^2/R$, or approximately $10^{-6}$ m/s². A stop of one month would therefore cost some 10 m/s.

In any given year then, a blanking device 4 can enable the NGST to examine the vicinity of 5 or 6 stars.

In order to examine the surroundings of 150 to 200 stars in a reasonable time, several blanking devices are necessary.

It is clear that the blanking devices have no need of results telemetering. Communication of results to the Earth is effected entirely by the NGST. The blanking devices only require a very modest set of instructions (i.e. a very low-speed telemetering link).

The main point is the execution of a position instruction to a one-meter accuracy for the blanking devices and, equally important, knowledge of the position of the NGST with the same accuracy.

In order to effect this manoeuvre so far away from Earth, while still remaining true to an economy of resources philosophy, stereoscopic laser shots or stereoscopic radio means are employed from Earth.

A radio or laser burst can easily attain a radial accuracy of one meter. To achieve a similar precision in the two orthoradial dimensions in a plane (preferably plane 30), one would need a stereoscopic base formed by two laser stations or two radio stations.

It is possible to locate an object at a distance of 1.5 million kilometers with several terrestrial laser or radio instruments separated by several thousands of kilometers.

Typically, an intrinsic laser or radio accuracy of the order of one centimeter is degraded by a stereoscopic factor of the order of 200, which results in the desired performance. The stereoscopic factor can be defined as the distance to the object divided by the distance between the lasers of the base.

Reflector means 46 of a laser beam or of positioning radio responders are thus put in place. The size of the reflectors or responders 46 of the necessary laser beams or location radios is not a problem for the blanking device 4.

It is also necessary to carry reflector or radio responder means 26 on the NGST, in order to achieve a one-meter precision on the location of the NGST also. It is also possible to use the existing resources and various radio channels on the NGST in order to act as stereoscopic radio channels.

In another positioning method, used in the case where the positioning accuracies are of the order of 5 meters, "trial and error" can be used, using moving means 45, by moving the screen 40 in relation to the blanking device 4 by several meters in the vicinity of the position calculated, until blanking is observed on the NGST 2.

To this end, and given that the mass of the screen 40 is very low, the blanking device includes means designed to move or rotate the screen 40 alone over distances of the order of half of its diameter.

Positioning of the blanking device 4 is simplified when the direction of observation makes an angle β in relation to the plane of the ecliptic 8.

Firstly, the position of the blanking device 4 on the Earth 7-blanking device 4 axis is easy to achieve by a direct laser pulse or a radio response time.

Secondly, the position of the blanking device 4 on an axis perpendicular to the ecliptic 8 can be obtained by using a laser or radio station in each hemisphere of the Earth (one north and one south). Only one stereoscopic measurement is then necessary in this case to position the blanking device 4 accurately.

By additionally restricting the mission to stars 1 close to the plane 8 of the ecliptic, namely to stars 1 located along a direction of observation making an angle β that is less than 10 degrees with this plane 8, excessive energy consumption is avoided.

Propulsion of the blanking device must be compatible with fifteen or so "stop and go" manoeuvres on the orbit. Thus, the propulsion means 44 of the blanking device 4 are compatible with a low thrust (to counter the potential of the Earth-Sun system and to immobilise the blanking device for the thirty or so days of an observation) and a substantial thrust (to achieve around 20 m/s fairly rapidly for the start-up of the blanking device 4 on the pseudo-orbit).

The total speed increment in order to execute twenty operations of this type over the lifetime of the operation would be of the order of some tens of meters per second, and in any event, of the order of magnitude of the speed increments that can be achieved by satellites.

The invention has many advantages.

It can be used to effect observations on planets by means of a relatively inexpensive mission, and one that achieves part of the objectives of the research missions while also creating a lead of several years.

The subject of the invention is an addition to a space telescope (preferably the NGST), and all of the instrumentation of the telescope can be employed in the service of the measurement. Nevertheless, strictly speaking, the observation time consumed on the telescope remains very low. The impact of the mission on the NGST is therefore very small, other than the need to know its position, typically to within one meter.

The blanking device is a very simple microsatellite, whose aiming requirements are very low. It requires only very limited upward telemetering and very moderate performance.

However the positioning requirements on the blanking device are high (typically 1 meter). Nevertheless, the positioning requirements are less severe than those on some research missions.

The screen itself is very light and very simple. It may be useful to equip it with the ability to move and/or rotate.

Less than ten or so copies of the blanking device need to be constructed and deployed at L2.

Given the speed increment necessary for the mission (much less than 1 km/s), the blanking device can reach the L2 point (500 m/s) by itself with the same propulsion system. It could therefore be, if not an ASAP (Ariane Structure for Auxiliary Payload), at least a micro/mini satellite in a central position on Ariane 5 or any other satellite launcher.

Thus, the invention is able to take advantage of independent projects in order to achieve new levels of performance and new products.

The invention claimed is:

1. A method for at least partial blanking of the light radiation emitted by at least one star from the observation aperture of an observation telescope in space, wherein the blanking occurs during a period of observation, comprising controlling the propulsion means of at least one autonomous blanking device in a pseudo-orbit in space around the telescope and positioning a screen of the device on the line of sight between the telescope and the star during the said observation period.

2. A method according to claim 1, further comprising determining the position of the blanking device and of the telescope using at least one radio or laser burst.

3. A method according to claim 1, further comprising modifying the degree of blanking of the light from the star in relation to the observation aperture of the telescope by moving the screen in relation to the device.

* * * * *